United States Patent [19]

Nakamura

[11] Patent Number: 4,932,063

[45] Date of Patent: Jun. 5, 1990

[54] NOISE SUPPRESSION APPARATUS

[75] Inventor: Shogo Nakamura, Matsudo, Japan

[73] Assignee: Ricoh Company, Ltd., Japan

[21] Appl. No.: 265,407

[22] Filed: Oct. 31, 1988

[30] Foreign Application Priority Data

Nov. 1, 1987 [JP] Japan ................................ 62-276418

[51] Int. Cl.$^5$ .............................................. H04B 15/00

[52] U.S. Cl. ........................................................ 389/94

[58] Field of Search ......................... 381/94, 71, 46, 47

[56] References Cited

U.S. PATENT DOCUMENTS

| | | | |
|---|---|---|---|
| 3,794,766 | 2/1974 | Cox et al. | 381/94 |
| 3,803,357 | 4/1974 | Sacks | 381/94 |
| 3,989,897 | 11/1976 | Carver | 381/94 |
| 4,065,718 | 12/1977 | Atwood . | |
| 4,135,590 | 1/1979 | Gaulder | 381/94 |
| 4,358,738 | 11/1982 | Kahn | 381/94 |
| 4,594,695 | 6/1986 | Garçonnat et al. | 381/71 |
| 4,636,586 | 1/1987 | Schiff | 381/94 |
| 4,723,294 | 2/1988 | Taguchi . | |
| 4,769,847 | 9/1988 | Taguchi | 381/94 |

FOREIGN PATENT DOCUMENTS

| | | |
|---|---|---|
| 2328317 | 12/1974 | Fed. Rep. of Germany . |
| 2701814 | 2/1979 | Fed. Rep. of Germany . |
| 3418297A1 | 11/1985 | Fed. Rep. of Germany . |
| 54-147708 | 5/1978 | Japan . |
| 56-115000 | 2/1980 | Japan . |

*Primary Examiner*—Forester W. Isen

*Attorney, Agent, or Firm*—Mason, Fenwick & Lawrence

[57] ABSTRACT

A noise suppression apparatus has a main microphone for mainly picking up a voice and for outputting an input signal including an audio signal and a first noise component generated from a noise source, a reference microphone for picking up a second noise component generated from the noise source, a filter bank for band-dividing the input signal from the main microphone and the second noise component from the reference microphone, and a noise cancel circuit for obtaining a phase difference between the input signal and the second noise component with respect to each divided band of the filter bank so as to correct the input signal based on the phase difference and for cancelling the first noise component in the input signal by use of the corrected input signal.

12 Claims, 2 Drawing Sheets

NOISE SUPPRESSION APPARATUS

BACKGROUND OF THE INVENTION

The present invention generally relates to noise suppression apparatuses, and more particularly to a noise suppression apparatus for suppressing a noise in a voice recognition apparatus which is used in measurements, robots and the like.

When picking up a voice (speech) under a noisy condition, it is necessary to extract a voice component from an input signal which includes both an audio signal and a noise component. However, there still does not exist a system which can easily and completely separate the audio signal and the noise component.

As methods of picking up the voice, there is a single input system and a plural input system which includes a double input system and the like. According to the single input system, no voice is picked up and only the noise component is initially picked up so as to analyze the noise component by a learning function. An inverse filter is designed based on the analyzed noise component, and the input which includes the audio signal and the noise component is passed through this inverse filter so as to improve a signal-to-noise (S/N) ratio of the input signal. Such a system is disclosed in a Japanese Laid-Open Patent Application No. 54-147708, for example.

However, the system according to the Japanese Laid-Open Patent Application No. 54-147708 requires both fast-Fourier-transform (FFT) and inverse FFT to constitute the inverse filter, and as a result, the operation is complex and the scale of the system as a whole becomes large.

On the other hand, according to the plural input system, a main microphone is used for picking up the voice and one or more reference microphones are used for picking up the noise component. When the noise component is simply subtracted from the input signal outputted from the main microphone, the operation is extremely simple but the noise eliminating effect cannot be obtained for a large frequency band because of the different phase characteristics of the microphones.

Hence, a Japanese Laid-Open Patent Application No. 56-115000 discloses a method of obtaining a correlation coefficient between the input signal from the main microphone and the signals from the reference microphone and varying a subtraction constant. But even according to this method, the noise eliminating effect is small despite the extremely complex operation, and this method is unsuited for practical use.

When the noise cannot be suppressed satisfactorily in the speech recognition apparatus, there is a problem in that the accuracy with which the voice recognition is made becomes poor.

SUMMARY OF THE INVENTION

Accordingly, it is a general object of the present invention to provide a novel and useful noise suppression apparatus in which the problems described above are eliminated.

Another and more specific object of the present invention is to provide a noise suppression apparatus comprising main input means for mainly picking up a voice and for outputting an input signal including an audio signal and a first noise component generated from a noise source, reference input means for picking up a second noise component generated from the noise source, filter bank means for band-dividing the input signal from the main input means and the second noise component from the reference input means, and noise cancel means for obtaining a phase difference between the input signal and the second noise component with respect to each divided band of the filter bank means so as to correct the input signal based on the phase difference and for cancelling the first noise component in the input signal by use of the corrected input signal. According to the noise suppression apparatus of the present invention, since the noise component is suppressed on the time spectrum pattern, a direct approach is provided for eliminating the noise mixed in the time spectrum pattern and the noise suppression apparatus is suited as a pre-processing system of a voice recognition apparatus which uses the time spectrum pattern for the pattern matching.

Other objects and further features of the present invention will be apparent from the following detailed description when read in conjunction with the accompanying drawings.

DETAILED DESCRIPTION

The operating principle of a noise suppression apparatus according to the present invention is as follows. That is, there are provided a close-talking microphone for picking up a voice (speech), a sensor microphone for picking up a noise, and a bandpass filter bank supplied with output signals of the close-talking microphone and the sensor microphone. A phase difference (error) between output signals of the close-talking microphone and the sensor microphone is obtained with respect to each band divided signal component from the bandpass filter bank, and the noise suppression or reduction is carried out in each frequency band by use of a signal which is corrected according to the phase difference.

The close-talking microphone picks up the voice while the sensor microphone picks up essentially the noise component only, but in most cases, the noise component is inevitably mixed to the voice when the close-talking microphone picks up the voice. Accordingly, the noise component included in the output signal of the close-talking microphone is cancelled by use of the noise component picked up by the sensor microphone. However, although the noise component mixed in the output signal of the close-talking microphone and the noise picked up by the sensor microphone have a correlation, there are subtle differences in amplitude and phase of the output signals of the two microphones. Thus, it is necessary to presume the differences in the amplitude and the phase of the output signals of the two microphones. In the noise suppression apparatus of the present invention, the differences in the amplitude and the phase of the output signals of the close-talking microphone and the sensor microphone are presumed with respect to each band divided signal component from the bandpass filter bank, and the noise suppression is carried out in each frequency band by use of a signal which is corrected according to the amplitude difference and the phase difference.

Figure 1:
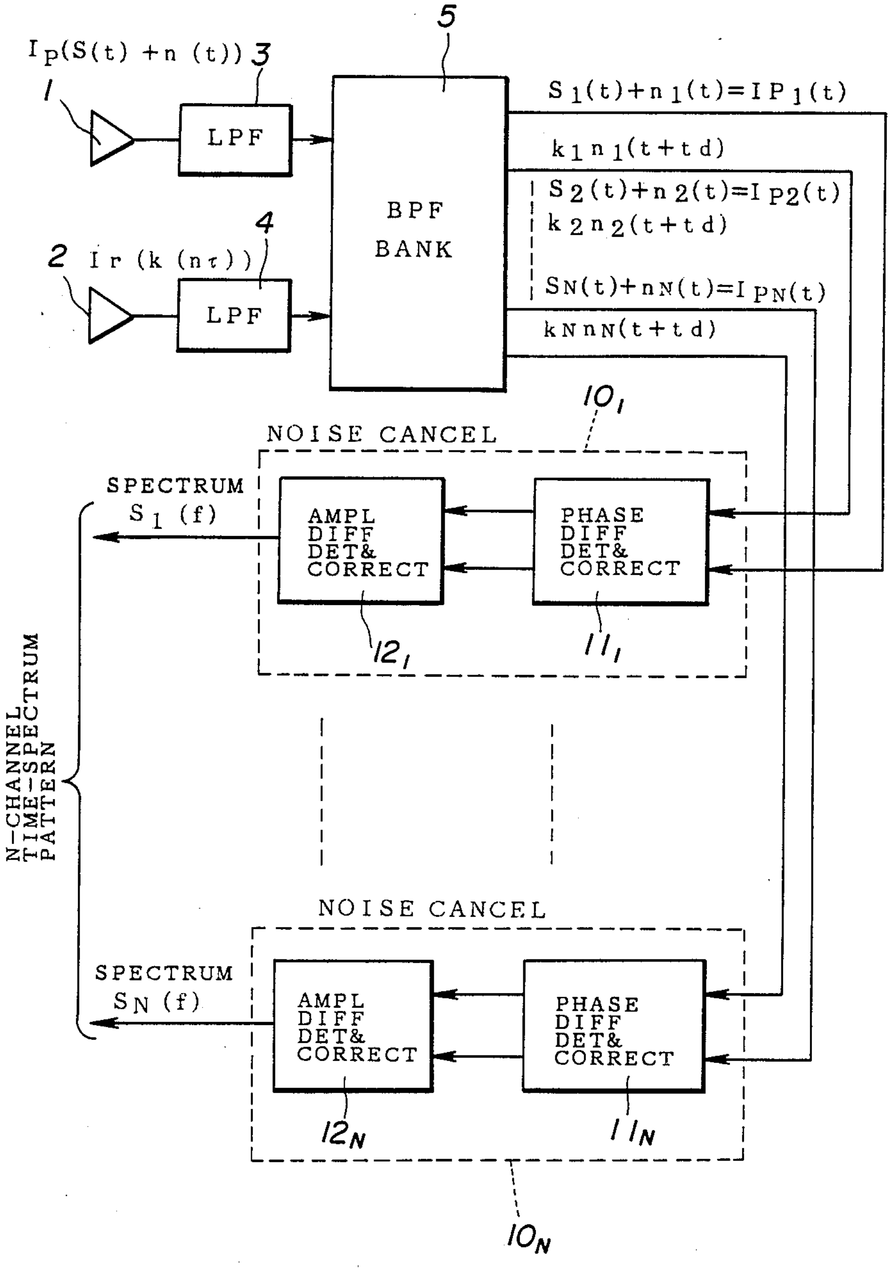
FIG. 1 is a system block diagram showing a first embodiment of a noise suppression apparatus according to the present invention.

FIG. 1 shows a first embodiment of the noise suppression apparatus according to the present invention. The noise suppression apparatus has a close-talking microphone 1 for picking up a voice (speech), a sensor microphone 2 for picking up a noise component, lowpass filters 3 and 4, a bandpass filter bank 5 made up of a plurality of bandpass filters, and noise eliminating circuits $10_1$ through $10_N$. The noise eliminating circuits $10_1$ through $10_N$ have the same construction, and an arbitrary noise eliminating circuit $10_i$ includes a phase difference detecting and correcting circuit $11_i$ and a level (amplitude) difference detecting and correcting circuit $12_i$. Each of the noise eliminating circuits $10_1$ through $10_N$ eliminate the noise component by use of a time signal analyzed in the bandpass filter bank 5 and a spectrum signal obtained by smoothing and rectifying the time signal.

The phase difference between the noise component mixed into the input signal picked up by the close-talking microphone 1 and the noise component picked up by the sensor microphone 2 is obtained as follows. That is, the output signal of the sensor microphone 2 is shifted by an appropriate resolution with respect to the band divided time signal, an absolute value of a difference between the two noise components is integrated, and the phase difference is obtained from a shift time which gives a minimum value for the integrated absolute value. In addition, by use of the fact that a ratio of the spectrum of the sensor microphone 2 and the spectrum of the close-talking microphone 1 decreases when there is a voice (speech) input, the amplitude ratio of the two noise components is renewed when the difference ratio of time deviations of the two spectrums is less than a predetermined threshold value by use of the spectrum information.

In FIG. 1, an input signal Ip obtained from the close-talking microphone 1 includes an audio signal s(t) and a noise component n(t). The noise component n(t) is generated by a source of the surrounding noise existing when the voice (speech) is picked up by the close-talking microphone 1. On the other hand, a noise component Ir(k·n(t+td)) generated from the same source as the noise component n(t) is obtained from the sensor microphone 2. k and td denote parameters respectively indicating an amplitude ratio and a phase difference between the two noise components n(t) and Ir(k·n(t+td)). The input signal Ip is supplied to the bandpass filter bank 5 through the lowpass filter 3, while the noise component Ir(k·n(t+td)) is supplied to the bandpass filter bank 5 through the lowpass filter 4.

It will be assumed for convenience sake that an output signal of an ith bandpass filter of the bandpass filter bank 5 is described by the following formulas (1) and (2).

$$Ipi=si(t)+ni(t) \quad (1)$$

$$Iri=ki\cdot ni(t+td) \quad (2)$$

By use of a parameter ki(n−1) presumed one round before, signals Ipi and Iri/ki(n−1) are respectively passed through an appropriate delay circuit (not shown) within the phase difference detecting and correcting circuit 11, so as to produce a signal Iritx by shifting the noise component Ir by an appropriate quantity with respect to the signal Ipi. This signal Iritx is described by ki·ni(t+td−tx)/ki(n−1), and an absolute value of Ipi−Iritx is integrated for a predetermined time by taking tx as a parameter. The parameter tx corresponds to the phase difference when the integrated value becomes a minimum.

In the amplitude difference detecting and correcting circuit $12_i$, the signal Ipi is rectified and smoothed into a signal Ipif, and the corrected signal Iri/ki(n−1) is rectified and smoothened into a signal Irif. A ratio Irif/Ipif is measured between the two rectified and smoothened signals Ipif and Irif, and by use of the ratio ki(n), the old presumed value ki(n−1) for ki is renewed by ki(n)·ki(n−1) when the difference ratio of the time deviations of the two spectrums is less than a threshold value th, where an initial value of Ki(n) is "1".

The conditions for determining the need for renewal are as follows.

$$Dsf=Ipif(t)-Ipif(t-1) \quad (3)$$

$$Dnf=Irif(t)=Irif(t-1) \quad (4)$$

The ratio ki(n) is renewed when Dsf−Dnf<th, and it is possible to presume irregular changes in ki and td by repeating such operations.

Figure 2:
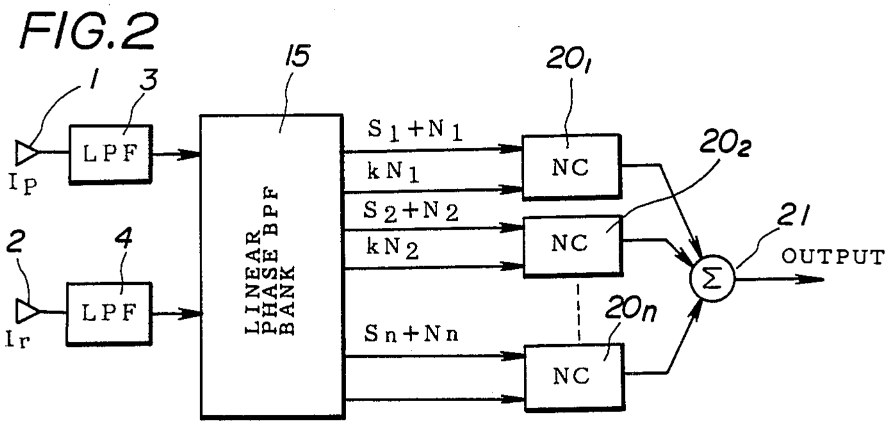
FIG. 2 is a system block diagram showing a second embodiment of the noise suppression apparatus according to the present invention.

FIG. 2 shows a second embodiment of the noise suppression apparatus according to the present invention. In FIG. 2, those parts which are essentially the same as those corresponding parts in FIG. 1 are designated by the same reference numerals, and a description thereof will be omitted. The noise suppression apparatus has the close-talking microphone 1 for picking up the voice (speech), the sensor microphone 2 for picking up the noise component, the lowpass filters 3 and 4, a linear phase bandpass filter bank 15 made up of a plurality of linear phase bandpass filters, noise cancel circuits $20_1$ through $20_N$, and an adding circuit 21.

In FIG. 2, the input signal Ip obtained from the close-talking microphone 1 includes the audio signal s(t) and the noise component n(t). The noise component n(t) is generated by the source of the surrounding noise existing when the voice (speech) is picked up by the close-talking microphone 1. On the other hand, a noise component kn(t') generated from the same source as the noise component n(t) is obtained from the sensor microphone 2. k denotes a level difference between the noise component kn(t') and the noise component n(t) which mixes into the audio signal s(t), and t' denotes a time sequence $t\pm\tau$ which takes into account the phase difference between t and t'. The signals Ip and kn(t') are respectively band-divided in the linear phase bandpass filter bank 15 and converted into time-spectrum patterns for each of N channels.

A time-spectrum pattern As(t) of the input signal Ip can be described by the following formula (5), and a time-spectrum pattern An(t) of the noise component kn(t') can be described by the following formula (6), where i denotes the channel number.

$$As(t) = \sum_{i=1}^{N} Si(t) + Ni(t) \quad (5)$$

-continued $$An(t) = \sum_{i=1}^{N} kNi(t') \quad (6)$$

These time-spectrum patterns As(t) and An(t) are supplied to the corresponding noise cancel circuits $20_1$ through $10_N$ so as to extract only the time-spectrum pattern of the audio signal s(t).

Figure 3:
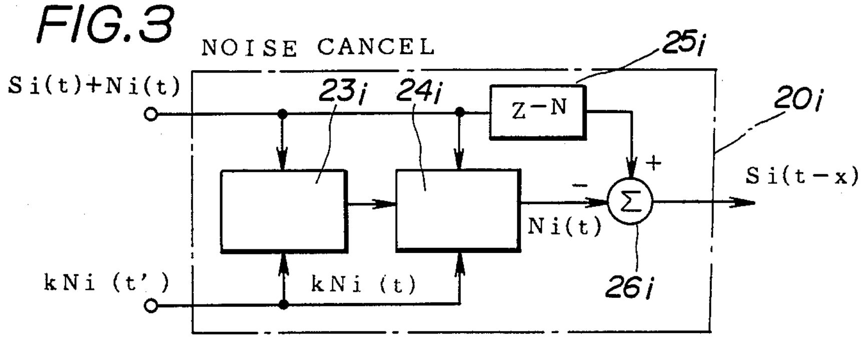
FIG. 3 is a system block diagram showing a noise cancel circuit of the second embodiment shown in FIG. 2.

FIG. 3 shows an embodiment of an arbitrary noise cancel circuit $20_i$ employed in the second embodiment. The noise cancel circuit $20_i$ has a level difference detecting part $23_i$, an audio interval detecting part $24_i$, a delay $25_i$, and an adding circuit $26_i$. The band divided time-spectrum patterns Si(t)+Ni(t) and kNi(t') are respectively subjected to a division by Si(t)+Ni(t) and kNi(t) so as to calculate an average of the level difference k. However, it is impossible to calculate the level difference k when the Si(t) is included, and the audio interval detecting part 24 is provided for this reason. The audio interval can be obtained from the spectrum difference of the time-spectrum patterns, and the spectrum differences Ds and Dn can be described by the following formulas (7) and (8).

$$Ds = As(t) - As(t-1) \quad (7)$$

$$Dn = An(t) - An(t-1) \quad (8)$$

A difference Dd between the spectrum differences Ds and Dn is obtained from the following formula (9), and a start of the audio interval is detected when the difference Dd exceeds a threshold value Lth. An end of the audio interval can be detected similarly.

$$Dd = Ds - Dn \quad (9)$$

Figure 4A:
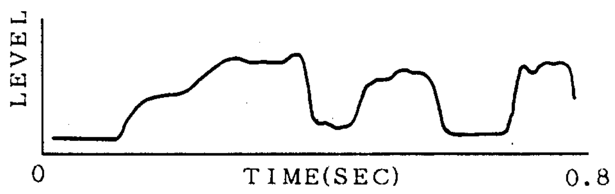
FIGS. 4A through 4C respectively show a spectrum pattern of voice alone, a spectrum pattern of an input signal corrected by use of the present invention, and a spectrum pattern before the correction and including a noise component.
Figure 4B:
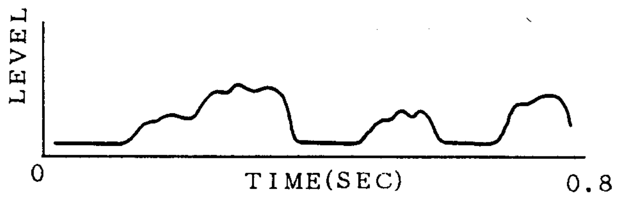
Figure 4C:
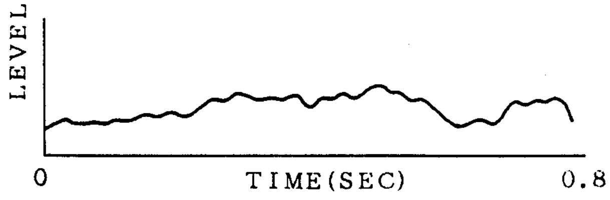

FIGS. 4A through 4C respectively show a spectrum pattern of voice alone, a spectrum pattern of the input signal Ip corrected by use of the present invention, and a spectrum pattern before the correction and including a noise component. The results shown in FIG. 4B are simulation results obtained by calculation. It can be easily seen by comparing FIGS. 4A through 4C that the noise component mixed to the audio signal is effectively suppressed according to the present invention.

As described before, the majority of the conventional voice recognition apparatuses employ a pattern matching using the time spectrum pattern for carrying out the recognition. Since the present invention suppresses the noise component on the time spectrum pattern, the present invention provides a direct approach for eliminating the noise mixed in the time spectrum pattern and is suited as a pre-processing system of a voice recognition apparatus which uses the time spectrum pattern for the pattern matching. The present invention is also advantageous in that the algorithm used is simple and the processing time is short.

Further, the present invention is not limited to these embodiments, but various variations and modifications may be made without departing from the scope of the present invention.

What is claimed is:

1. An apparatus for noise suppression of a voice that includes audio and noise, said apparatus comprising:
main input means for primarily picking up the voice and for outputting an input signal including an audio signal and a first noise component, said first noise component being generated from the noise in the voice;
reference input means for picking up a second noise component generated from the noise in the voice;
filter bank means for band-dividing the input signal from said main input means and the second noise component from said reference input means to output a plurality of divided band components; and
noise cancelling means for obtaining a phase difference between the input signal and the second noise component with respect to each of the divided band components output from said filter bank means so as to correct the input signal based on the phase difference and for cancelling the first noise component in said input signal.

2. A noise suppression apparatus as claimed in claim 1 in which said filter bank means has first through Nth bandpass filters, an ith bandpass filter outputting Ipi=-si(t)+ni(t) and Iri=Ki·ni(t+td) responsive to the input signal Ip=s(t)+n(t), where N is an integer greater than or equal to two, s(t) denotes the audio signal, n(t) denotes the first noise component, Ir(k·n(t+td)) denotes the second noise component, and k and td are parameters respectively describing an amplitude difference and a phase difference between the first and second noise components n(t) and Ir(k·n(t+td)).

3. A noise suppression apparatus as claimed in claim 2 in which said noise cancelling means has a first circuit for detecting and correcting the phase difference between the first and second noise components n(t) and Ir(k·n(t+td)), and a second circuit for detecting and correcting the amplitude difference between the first and second noise components n(t) and Ir(k·n(t+td)).

4. A noise suppression apparatus as claimed in claim 3 in which said first circuit includes means for producing a signal Iritx=ki·ni(t+td−tx)/ki(n−1) by shifting the second noise component Ir by an appropriate quantity with respect to the signal Ipi and means for integrating an absolute value of Ipi−Iritx by taking tx as a parameter which corresponds to the phase difference when an integrated value is a minimum.

5. A noise suppression apparatus as claimed in claim 4 in which said second circuit has means for respectively producing, rectifying and smoothing the signal Ipi and a corrected signal Iri/ki(n−1) into signals Ipif and Irif, means for obtaining a ratio Irif/Ipif, means for renewing an old presumed value ki(n−1) for ki by ki(n)·ki(n−1) by use of a ratio ki(n) when a difference ratio of time deviations of two spectrums is less than a threshold value th, where an initial value of Ki(n) is 1.

6. A noise suppression apparatus as claimed in claim 5 in which said means for renewing the old presumed value ki(n−1) determines a need for a renewal depending on formulas $$Dsf = Ipif(t) - Ipif(t-1)$$

$$Dnf = Irif(t) - Irif(t-1)$$

where the ratio ki(n) is renewed when Dsf−Dnf<th.

7. A noise suppression apparatus as claimed in claim 1 in which said filter bank means has first through Nth linear phase bandpass filters, an ith linear phase bandpass filter band-dividing the input signal Ip=s(t)+n(t) and the second noise component kn(t') and converting the signals Ip and kn(t') into time-spectrum patterns for each of N channels, where N is an integer greater than or equal to two and s(t) denotes the audio signal and n(t) denotes the first noise component.

8. A noise suppression apparatus as claimed in claim 1 in which said filter bank means has first through Nth linear phase bandpass filters, an ith linear phase bandpass filter outputting a time-spectrum pattern $$As(t) = \sum_{i=1}^{N} Si(t) + Ni(t)$$

of the input signal Ip and a time-spectrum pattern $$An(t) = \sum_{i=1}^{N} kNi(t')$$

of the second noise component kn(t') responsive to the input signal Ip=s(t)+n(t) and the second noise component kn(t'), where N is an integer greater than or equal to two, i denotes a channel number, s(t) denotes the audio signal, n(t) denotes the first noise component, k denotes a level difference between the second noise component kn(t') and the first noise component n(t) which mixes into the audio signal s(t), and t' denotes a time segment t± which takes into account a phase difference between t and t'.

9. A noise suppression apparatus as claimed in claim 8 in which said noise cancelling means has a first circuit for detecting the level difference between the second noise component kn(t') and the first noise component n(t) which mixes into the audio signal s(t) and a second circuit for detecting an audio interval.

10. A noise suppression apparatus as claimed in claim 9 in which said first circuit obtains an average of the level difference k.

11. A noise suppression apparatus as claimed in claim 9 in which said second circuit detects the audio interval from a difference Dd with reference to a threshold value Lth, where Dd=Ds−Dn, Ds and Dn are spectrum differences of the time-spectrum patterns described by $$Ds=As(t)-As(t-1)$$

$$Dn=An(t)-An(t-1).$$

12. A noise suppression apparatus as claimed in claim 11 in which said second circuit detects a start of the audio interval when the difference Dd exceeds the threshold value Lth.

* * * * *